(12) United States Patent
Trainin et al.

(10) Patent No.: US 10,117,181 B2
(45) Date of Patent: Oct. 30, 2018

(54) APPARATUS, SYSTEM AND METHOD OF COMMUNICATING A NON-DATA PHYSICAL LAYER CONVERGENCE PROCEDURE (PLCP) PROTOCOL DATA UNIT (PPDU)

(71) Applicant: INTEL IP CORPORATION, Santa Clara, CA (US)

(72) Inventors: Solomon B. Trainin, Haifa (IL); Assaf Kasher, Haifa (IL); Tom Harel, Shfaim (IL); Ran Mor, Herzlia (IL); Michael Genossar, Modiin (IL)

(73) Assignee: INTEL IP CORPORATION, Santa Clara, CA (US)

( * ) Notice: Subject to any disclaimer, the term of this patent is extended or adjusted under 35 U.S.C. 154(b) by 92 days.

(21) Appl. No.: 15/199,445

(22) Filed: Jun. 30, 2016

(65) Prior Publication Data

US 2017/0033965 A1    Feb. 2, 2017

Related U.S. Application Data

(60) Provisional application No. 62/199,257, filed on Jul. 31, 2015.

(51) Int. Cl.
| | |
|---|---|
| *G01R 31/08* | (2006.01) |
| *H04L 5/14* | (2006.01) |
| *H04J 3/00* | (2006.01) |
| *H04W 52/02* | (2009.01) |
| *H04L 1/00* | (2006.01) |

(Continued)

(52) U.S. Cl.
CPC ......... *H04W 52/0229* (2013.01); *H04L 1/00* (2013.01); *H04L 27/2613* (2013.01); *H04W 52/0209* (2013.01); *H04W 74/0816* (2013.01); *Y02B 60/50* (2013.01); *Y02D 70/00* (2018.01)

(58) Field of Classification Search
CPC ............................ H04W 52/0229; H04L 1/00
See application file for complete search history.

(56) References Cited

U.S. PATENT DOCUMENTS

| | | | |
|---|---|---|---|
| 2005/0117530 A1* | 6/2005 | Abraham | H04W 52/0232 370/310 |
| 2011/0194644 A1* | 8/2011 | Liu | H04L 5/0023 375/295 |

(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Brian Roberts
*Assistant Examiner* — Abu-Sayeed Haque
(74) *Attorney, Agent, or Firm* — Shichrur & Co.

(57) ABSTRACT

Some demonstrative embodiments include apparatuses, devices, systems and methods of communicating a non-data Physical Layer Convergence Procedure (PLCP) Protocol Data Unit (PPDU). For example, an apparatus may include circuitry and logic configured to cause a wireless station to transmit a non-data PPDU; and to transmit a control frame separated from the non-data PPDU by a Reduced Inter-Frame Space (RIFS).

25 Claims, 7 Drawing Sheets

(51) Int. Cl.
*H04W 74/08* (2009.01)
*H04L 27/26* (2006.01)

(56) References Cited

U.S. PATENT DOCUMENTS

| | | | | |
|---|---|---|---|---|
| 2011/0222408 A1* | 9/2011 | Kasslin | ........... | H04L 41/083 370/241 |
| 2013/0034091 A1* | 2/2013 | Kim | ........... | H04W 52/16 370/338 |
| 2013/0176998 A1* | 7/2013 | Choudhury | ........... | H04W 16/14 370/338 |
| 2013/0229996 A1* | 9/2013 | Wang | ........... | H04W 72/0413 370/329 |
| 2013/0301551 A1* | 11/2013 | Ghosh | ........... | H04W 72/042 370/329 |
| 2013/0301569 A1* | 11/2013 | Wang | ........... | H04L 5/0055 370/329 |
| 2014/0185695 A1* | 7/2014 | Kenney | ........... | H04L 27/2613 375/260 |
| 2015/0029844 A1* | 1/2015 | Pathmasuntharam | ........... | H04W 28/22 370/230 |
| 2015/0146700 A1* | 5/2015 | Wentink | ........... | H04W 74/0816 370/336 |
| 2015/0270993 A1* | 9/2015 | Cheung | ........... | H04L 25/03159 375/232 |
| 2015/0349857 A1* | 12/2015 | Cordeiro | ........... | H04B 7/0413 375/267 |
| 2016/0323861 A1* | 11/2016 | Cordeiro | ........... | H04B 7/0452 |
| 2017/0230863 A9* | 8/2017 | Das | ........... | H04W 28/065 |

OTHER PUBLICATIONS

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

* cited by examiner

APPARATUS, SYSTEM AND METHOD OF COMMUNICATING A NON-DATA PHYSICAL LAYER CONVERGENCE PROCEDURE (PLCP) PROTOCOL DATA UNIT (PPDU)

CROSS REFERENCE

This Application claims the benefit of and priority from U.S. Provisional Patent Application No. 62/199,257 entitled "APPARATUS, SYSTEM AND METHOD OF INDICATING COMMUNICATION OF A FRAME IN A WIRELESS NETWORK", filed Jul. 31, 2015, the entire disclosure of which is incorporated herein by reference.

TECHNICAL FIELD

Embodiments described herein generally relate to communicating a non-data Physical Layer Convergence Procedure (PLCP) Protocol Data Unit (PPDU).

BACKGROUND

In some wireless networks, for example, networks implementing a carrier sense multiple access (CSMA) mechanism, a receiver may be required to be able to receive any transmitted frame, for example, even when no frames are sent for a long time.

This requirement may result in increased power consumption of the receiver.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
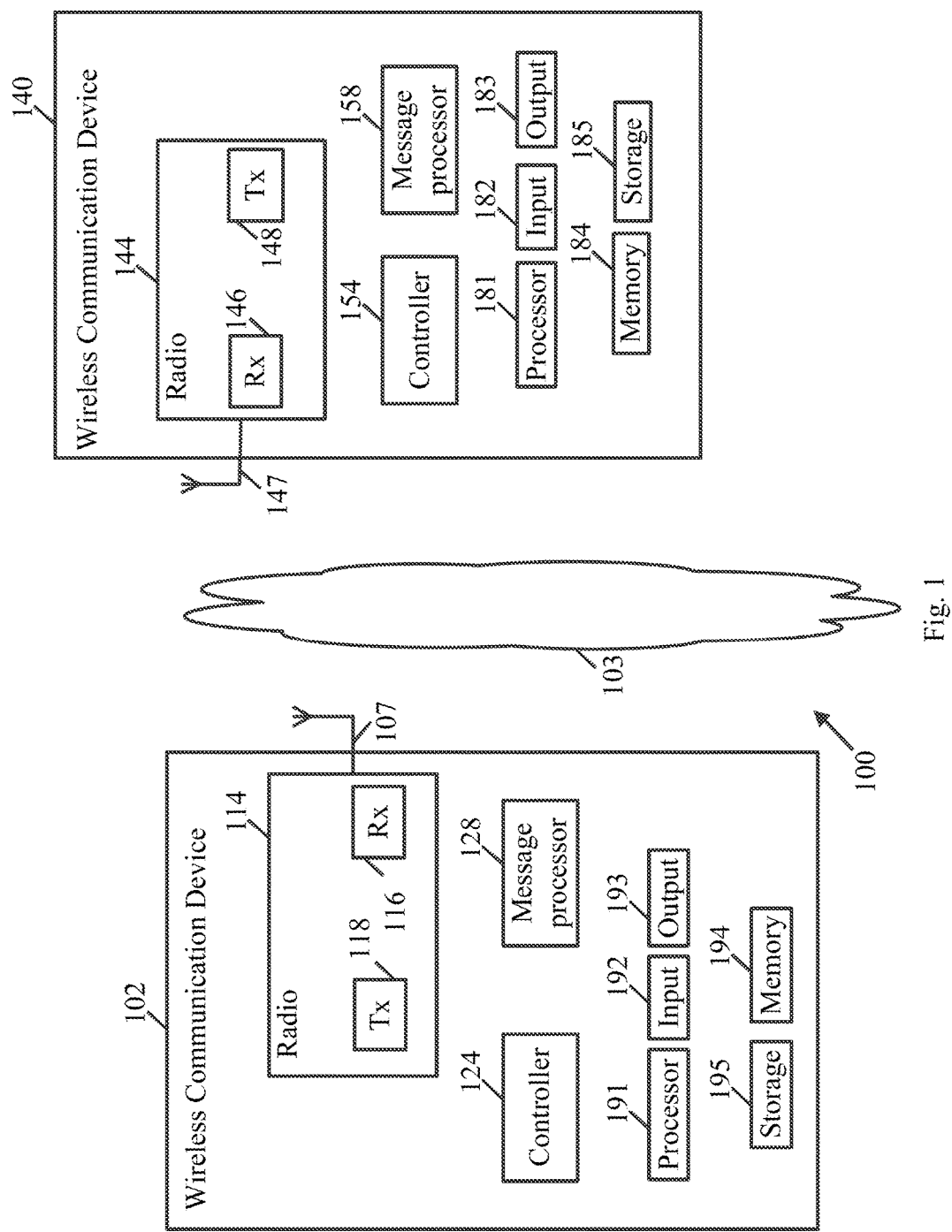
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012 (*IEEE 802.11-2012, IEEE Standard for Information technology—Telecommunications and information exchange between systems Local and metropolitan area networks—Specific requirements Part 11: Wireless LAN Medium Access*

Control (MAC) and Physical Layer (PHY) Specifications, Mar. 29, 2012); IEEE802.11ac-2013 ("*IEEE P802.11ac-2013, IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment 4: Enhancements for Very High Throughput for Operation in Bands below* 6 *GHz*", December, 2013); IEEE 802.11ad ("*IEEE P*802.11*ad*-2012, *IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 3: *Enhancements for Very High Throughput in the* 60 *GHz Band*", 28 December, 2012); IEEE-802.11REVmc ("*IEEE* 802.11-*REVmc™/D*3.0, *June* 2014 *draft standard for Information technology—Telecommunications and information exchange between systems Local and metropolitan area networks Specific requirements; Part* 11: *Wireless LAN Medium Access Control (MAC) and Physical Layer (PHY) Specification*"); IEEE 802.11ax (*IEEE* 802.11*ax, High Efficiency WLAN (HEW)*); IEEE802.11-ay (*P*802.11*ay Standard for Information Technology—Telecommunications and Information Exchange Between Systems Local and Metropolitan Area Networks—Specific Requirements Part* 11: *Wireless IAN Medium Access Control (MAC) and Physical Layer (PHY) Specifications—Amendment: Enhanced Throughput for Operation in License-Exempt Bands Above* 45 *GHz*)) and/or future versions and/or derivatives thereof) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, April 2011, Final specification) and/or future versions and/or derivatives thereof, devices and/or networks operating in accordance with existing Wireless Fidelity (WiFi) Alliance (WFA) Peer-to-Peer (P2P) specifications (*WiFi P2P technical specification*, version 1.5, Aug. 4, 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Bluetooth (BT) specifications and/or protocols and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, device 102 and/or device 140 may include and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more DMG STAs. For example, device 102 may include, operate as, and/or perform the functionality of, at least one DMG STA, and/or device 140 may include, operate as, and/or perform the functionality of, at least one DMG STA.

In other embodiments, devices 102 and/or 140 may operate as and/or perform one or more functionalities of any other wireless device and/or station, e.g., a WLAN STA, a WiFi STA, and the like.

In some demonstrative embodiments, device 102 and/or device 140 may be configured to operate as, perform a role of, and/or perform the functionality of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform a role of, and/or perform the functionality of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform a role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, wireless communication device 102 and/or device 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data.

For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, a mmWave band, and/or any other band, for example, a 2.4 GHz band, a 5 GHz band, a S1G band, and/or any other band.

In some demonstrative embodiments, radio 114 and/or radio 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be configured to be steered to a plurality of beam directions.

In some demonstrative embodiments, device 102 may include a controller 124, and/or device 140 may include a controller 154. Controllers 124 and/or 154 may be configured to perform one or more communications, may generate and/or communicate one or more messages and/or transmissions, and/or may perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

Some demonstrative embodiments may be implemented, for example, as part of a new standard in an mmWave band, e.g., a 60 GHz frequency band or any other directional band, for example, as an evolution of an *IEEE 802.11ad standard*.

In some demonstrative embodiments, devices 102 and/or 140 may be configured according to one or more standards, for example, in accordance with an *IEEE 802.11ay Standard*, which may be, for example, configured to enhance the efficiency and/or performance of an *IEEE 802.11ad Specification*, which may be configured to provide Wi-Fi connectivity in a 60 GHz band.

Some demonstrative embodiments may enable, for example, to significantly increase data transmission rates defined in the *IEEE 802.11ad specification*, which may, for example, satisfy growing demand in network capacity for new coming applications.

Some communications over a wireless communication band, for example, a DMG band or any other band, may be performed over a single channel bandwidth (BW). For example, the *IEEE 802.11ad Specification* defines a 60 GHz system with a single channel bandwidth (BW) of 2.16 GHz, which is to be used by all Stations (STAs) for both transmission and reception.

In some demonstrative embodiments, device 102 and/or device 140 may be configured to implement one or more mechanisms, which may, for example, enable to extend a single-channel BW scheme, e.g., a scheme in accordance with the *IEEE 802.11ad Specification* or any other scheme, for higher data rates and/or increased capabilities, e.g., as described below.

In some demonstrative embodiments, device 102 and/or device 140 may be configured to implement one or more channel bonding mechanisms, which may, for example, support communication over bonded channels.

In some demonstrative embodiments, the channel bonding mechanisms may include, for example, a mechanism and/or an operation whereby two or more channels can be combined, e.g., for a higher bandwidth of packet transmission, for example, to enable achieving higher data rates, e.g., when compared to transmissions over a single channel Some demonstrative embodiments are described herein with respect to communication over a bonded channel, however other embodiments may be implemented with respect to communications over a channel, e.g., a "wide" channel, including or formed by two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, a channel BW of 6.48 GHz, and/or any other additional or alternative channel BW.

In some demonstrative embodiments, devices 102 and/or 140 may be configured to communicate over a Next Generation 60 GHz (NG60) network, an Extended DMG (EDMG) network, and/or any other network. For example, devices 102 and/or 140 may be configured to use channel bonding, for example, for communicating over the NG60 and/or EDMG networks.

Some Specifications, e.g., an *IEEE 802.11ad Specification*, may be configured to support a Single User (SU) system, in which a Station (STA) cannot transmit frames to more than a single STA at a time. Such Specifications may not be able, for example, to support a STA transmitting to multiple STAs simultaneously, for example, using a multi-user MIMO (MU-MIMO) scheme, e.g., a downlink (DL) MU-MIMO, or any other MU scheme.

In some demonstrative embodiments, devices 102 and/or 140 may be configured to implement one or more Multi-User (MU) mechanisms. For example, devices 102 and/or 140 may be configured to implement one or more MU mechanisms, which may be configured to enable MU communication of Downlink (DL) frames using a Multiple-Input-Multiple-Output (MIMO) scheme, for example, between a device, e.g., device 102, and a plurality of devices, e.g., including device 140 and/or one or more other devices.

In some demonstrative embodiments, devices 102 and/or 140 may be configured to communicate over a Next Generation 60 GHz (NG60) network, an Extended DMG (EDMG) network, and/or any other network. For example, devices 102 and/or 140 may be configured to communicate MIMO, e.g., DL MU-MIMO, transmissions and/or use channel bonding, for example, for communicating over the NG60 and/or EDMG networks.

In some demonstrative embodiments, devices 102 and/or 140 may be configured to support one or more mechanisms and/or features, for example, channel bonding, single user (SU) MIMO, and/or and multi user (MU) MIMO, for example, in accordance with an *IEEE 802.11ay Standard* and/or any other standard and/or protocol.

In some demonstrative embodiments, devices 102 and/or 140 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In one example, an EDMG STA may include a DMG STA whose radio transmitter is capable of transmitting and receiving EDMG physical layer (PHY) protocol data units (PPDUs). The EDMG STA may perform any other additional or alternative functionality.

In some demonstrative embodiments, devices 102 and/or 140 may include EDMG STAs capable of communicating in an EDMG BSS.

In some demonstrative embodiments, devices 102 and/or 140 may be configured to support the one or more mechanisms and/or features in a backwards compatible manner, e.g., in a manner which may be compatible with one or more devices ("legacy devices"), which may not support these mechanisms and/or features, e.g., one or more non-EDMG stations, for example, stations configured according to an *IEEE 802.11ad Standard*, and the like.

In one example, a legacy station (STA), for example, a DMG STA, may include, may comply with, and/or may be configured according to, a first specification, for example, an *IEEE 802.11ad Specification*, while a non-legacy station (STA), for example, an EDMG STA, may include, may comply with, and/or may be configured according to, a second specification, for example, an *IEEE 802.11ay Specification*, or any other Specification.

In some demonstrative embodiments, devices 102 and/or 140 may be configured to be able to communicate in a deployment, scenario, and/or implementation ("mixed scenario"), which may include both one or more legacy STAs as well as one or more non-legacy STAs, e.g., as described below.

In some demonstrative embodiments, in some systems and/or networks, for example, systems and/or networks implementing a carrier sense multiple access (CSMA) mechanism, a receiver device may not be able to predict a time a frame may arrive, while the receiver device may be required to be able to receive any transmitted frame, e.g., even when no frames are sent for a long time.

In some demonstrative embodiments, a power efficiency of the receiver device may depend, for example, on an amount of circuitry components to be remain powered, while the receiver device is operating in a low power state, e.g., during a silent time between received communications.

In some demonstrative embodiments, the circuitry components that remain powered, e.g., during the low power state, may be responsible to activate the entire components of the receiver device, for example, to successfully receive an incoming frame.

In some demonstrative embodiments, the amount of power spent, e.g., while the receiver device is in the low power state, may depend, for example, on an ability to activate receive circuits in the receiver device in time, e.g., to enable the receiver device to successfully receive the incoming frame.

In some demonstrative embodiments, extending a preamble of a packet, e.g., to enable the receiver device to have a longer period of time to activate the receive circuits in the receiver device in time to receive the packet, may not be applicable, for example, when backward compatibility is required, e.g., especially with control frames, such as, for example, a Request To Send (RTS) frame and/or a Clear To Send (CTS) frame.

Some demonstrative embodiments may enable a device, for example, to minimize power spent by the device in the low power state, for example, while still enabling the device to decode an arrived frame, e.g., a control frame, for example, while maintaining the backward compatibility.

In some demonstrative embodiments, devices 102 and/or 140 may be configured to preface transmission of a frame, for example, a control frame, by an indication frame, which may be configured to indicate the transmission of the frame, e.g., as described below.

In some demonstrative embodiments, devices 102 and/or 140 may be configured to preface transmission of a frame, e.g., a control frame, for example, by an indication frame, which may be separated, for example, by a reduced interframe space (RIFS) time, from the control frame, e.g., as described below.

In some demonstrative embodiments, the indication frame may include a non-data physical layer convergence procedure (PLCP) protocol data unit (PPDU) (also referred to as "preamble frame"), e.g., as described below. In other embodiments, the indication frame may include any other type of frame.

In some demonstrative embodiments, device 102 may be configured to generate and transmit the indication frame followed by the control frame, e.g., as described below.

In some demonstrative embodiments, controller 124 may be configured to control, cause and/or trigger device 102 and/or message processor 128 to generate a non-data PPDU.

In some demonstrative embodiments, controller 124 may be configured to control, cause and/or trigger device 102 and/or transmitter 118 to transmit the non-data PPDU, e.g., to device 140.

In some demonstrative embodiments, controller 124 may be configured to control, cause and/or trigger device 102 and/or transmitter 118 to transmit, e.g., to device 140, a control frame, which may be, for example, separated from the non-data PPDU, e.g., by a RIFS.

In some demonstrative embodiments, the control frame may include an RTS frame, e.g., as described below. In other embodiments, the control frame may include a CTS frame, e.g., as described below. In other embodiments, the control frame may include any other type of frame.

In some demonstrative embodiments, controller 154 may be configured to control, cause and/or trigger device 140 to operate at a low power receive state, for example, to detect one or more transmissions, e.g., as described below.

In some demonstrative embodiments, the low power receive state may be configured to allow device 140 to detect the non-data PPDU.

In some demonstrative embodiments, device 140 may be configured to detect and/or process the indication frame, e.g., the non-data PPDU, for example, when device 140 operates at the low power receive state, e.g., as described below.

In some demonstrative embodiments, device 140 may detect the non-data PPDU from device 102.

In some demonstrative embodiments, controller 154 may be configured to control, cause and/or trigger device 140 to switch to an active power receive state, for example, upon detecting the non-data PPDU from device 102.

In some demonstrative embodiments, controller 154 may be configured to control, cause and/or trigger device 140 to switch to the active power receive state, which may be configured to allow device 140 to receive the control frame, e.g., the RTS frame, from device 102.

In some demonstrative embodiments, controller 154 may be configured to control, cause and/or trigger device 140 to switch to the active power receive state, for example, in time to receive and/or process the control frame, e.g., the RTS frame, which may be separated from the non-data PPDU from device 102, for example, by the RIFS.

In some demonstrative embodiments, controller 154 may be configured to allow device 140 to determine whether or not to switch back to the low power receive state, for example, based on the control frame, e.g., based on the RTS frame. For example, controller 154 may be configured to allow device 140 to switch back to the low power receive state, for example, if it is determined that the control frame is not addressed to the device 140, e.g., as described below.

In one example, controller 154 may allow device 140 to switch back to the low power receive state, for example, if the control frame indicate that communication from device 102 is not intended for device 140.

In some demonstrative embodiments, the non-data PPDU may be configured, for example, such that the non-data PPDU may be interpretable by a legacy station as an invalid PPDU, e.g., as described below.

In some demonstrative embodiments, the control frame may be decodable by the legacy station, e.g., as described below.

In one example, the control frame may be decodable by the legacy station, for example, to enable the legacy station refrain from transmission, e.g., by setting a Network allocation Vector (NAV), during communication between devices 102 and 140, e.g., upon detecting the control frame, e.g., the RTS or CTS frame, communicated between devices 102 and 140.

In some demonstrative embodiments, the RIFS may include, for example, a time by which multiple transmissions from a single station may be separated. In other embodiments, the RIFS may be defined in any other manner.

In some demonstrative embodiments, the RIFS may be shorter than a Short Inter-Frame Space (SIFS).

In some demonstrative embodiments, the RIFS may have, for example, a duration of 1 microsecond (μs). In other embodiments, the RIFS may have any other duration.

In some demonstrative embodiments, the non-data PPDU may have a duration of no more than 5 microseconds.

In some demonstrative embodiments, the non-data PPDU may have a duration of no more than an aSlotTime.

In other embodiments, the non-data PPDU frame may have any other duration.

In some demonstrative embodiments, the non-data PPDU may include a non-data non-PLCP Header PPDU, which may include only a preamble, for example, in accordance with a first non-data PPDU format, e.g., as described below.

In some demonstrative embodiments, the non-data non-PLCP Header PPDU may include only a short training field (STF), e.g., as described below.

In some demonstrative embodiments, the STF of the non-data PPDU may include training sequences, which do not end with a stop sequence, e.g., as described below.

In some demonstrative embodiments, the non-data PPDU may include no more than a preamble and a PLCP header, for example, in accordance with a second non-data PPDU format, e.g., as described below.

In some demonstrative embodiments, the PLCP header of the non-data PPDU may include a length field including a zero length value, e.g., as described below.

Figure 2A:
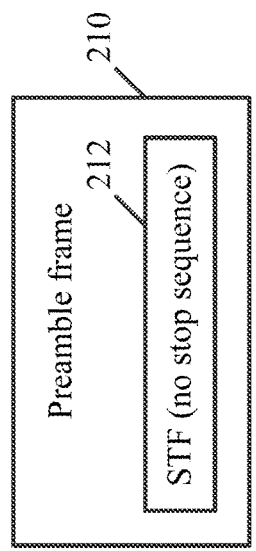
FIG. 2A is a schematic illustration of a format of a non-data Physical Layer Convergence Procedure (PLCP) Protocol Data Unit (PPDU), in accordance with some demonstrative embodiments.

Reference is made to FIG. 2A, which schematically illustrate a format of a non-data PPDU 210, in accordance with some demonstrative embodiments. For example, non-data PPDU 210 may include a non-data non-PLCP header PPDU, e.g., as described below.

In some demonstrative embodiments, device 102 (FIG. 1) and/or device 140 (FIG. 1) may be configured to generate, transmit, detect, receive and/or process non-data PPDU 210.

In some demonstrative embodiments, device 102 (FIG. 1) and/or device 140 (FIG. 1) may be configured to detect, receive and/or process non-data PPDU 210, for example, even when operating at a low power receive state.

In some demonstrative embodiments, a first station, e.g., a station implemented by device 102 (FIG. 1), may be configured to generate and transmit non-data PPDU 210, for example, followed by a control frame, which may be separated from the non-data PPDU 210, e.g., by a RIFS.

In some demonstrative embodiments, a second station, e.g., a station implemented by device 140 (FIG. 1), may be configured to detect, receive, and/or process non-data PPDU 210, for example, even while the second station is at the low power receive state; and to switch to an active power receive state, for example, in time to receive and/or process the control frame, which may be separated from the non-data PPDU 210, e.g., by a RIFS.

In some demonstrative embodiments, as shown in FIG. 2A non-data PPDU 210 may include a non-data non-PLCP Header PPDU 210, which may include only a preamble.

In some demonstrative embodiments, as shown in FIG. 2A, the non-data non-PLCP Header PPDU 210 may include only an STF 212.

In some demonstrative embodiments, STF 212 may not end with a stop sequence.

Figure 2B:
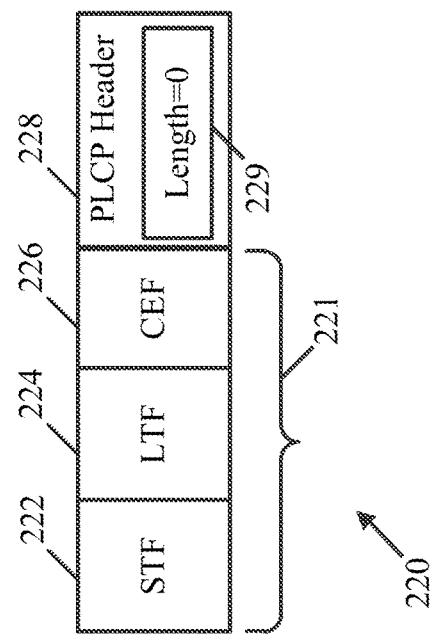
FIG. 2B is a schematic illustration of a format of a non-data PPDU, in accordance with some demonstrative embodiments.

Reference is made to FIG. 2B, which schematically illustrate a format of a non-data PPDU 220, in accordance with some demonstrative embodiments.

In some demonstrative embodiments, device 102 (FIG. 1) and/or device 140 (FIG. 1) may be configured to generate, transmit, detect, receive and/or process non-data PPDU 220.

In some demonstrative embodiments, device 102 (FIG. 1) and/or device 140 (FIG. 1) may be configured to detect, receive and/or process non-data PPDU 220, for example, even when operating at a low power receive state.

In some demonstrative embodiments, a first station, e.g., a station implemented by device 102 (FIG. 1), may be configured to generate and transmit non-data PPDU 220, for example, followed by a control frame, which may be separated from the non-data PPDU 220, e.g., by a RIFS.

In some demonstrative embodiments, a second station, e.g., a station implemented by device 140 (FIG. 1), may be configured to detect, receive, and/or process non-data PPDU 220, for example, even while the second station is at the low power receive state; and to switch to an active power receive state, for example, in time to receive and/or process the control frame, which may be separated from the non-data PPDU 220, e.g., by a RIFS.

In some demonstrative embodiments, as shown in FIG. 2B, non-data PPDU 220 may include a preamble 221 and a PLCP header 228.

In some demonstrative embodiments, as shown in FIG. 2B, non-data PPDU 220 may include no more than preamble 221 and PLCP header 228

In some demonstrative embodiments, as shown in FIG. 2B, preamble 221 may include one or more of an STF 222, a Long Training Field (LTF) 224, and/or a Channel Estimation Field (CEF) 226.

In some demonstrative embodiments, as shown in FIG. 2B, PLCP header 228 may include a length field 229 including a zero length value.

In some demonstrative embodiments, PLCP header 228 may include 6 bytes of null data, for example, to match a number of data bytes in a first Low-density parity-check (LDPC) word in any control PHY packet.

In some demonstrative embodiments, device 140 (FIG. 1) may be configured to receive a non-data PPDU, e.g., the non-data PPDU 210 (FIG. 2A) or the non-data PPDU 220 (FIG. 2B), from device 102 (FIG. 1), for example, even while device 140 is operating at the lower power state.

In some demonstrative embodiments, device 140 (FIG. 1) may be configured to, upon detecting the non-data PPDU, e.g., the non-data PPDU 210 (FIG. 2A) or the non-data PPDU 220 (FIG. 2B), switch to an active state, to allow device 140 (FIG. 1) to receive from device 102 (FIG. 1) the control frame, which may be separated from the non-data PPDU, e.g., by a RIFS.

In some demonstrative embodiments, a legacy station, which may detect non-data PPDU 210 (FIG. 2A), may time out, and may go back to an acquisition mode, for example, before a next packet begins and/or arrives.

In some demonstrative embodiments, a legacy station, which may detect the non-data PPDU 220 (FIG. 2B), may drop the packet just in time, e.g., to receive a following actual packet, for example, since PLCP header 228 (FIG. 2B) may be interpreted by the legacy station to have an "illegal" zero length in length field 229 (FIG. 2B).

In some demonstrative embodiments, a non-legacy station, e.g., device 140 (FIG. 1), which may detect non-data PPDU 210 (FIG. 2A), may be able to wake up a radio of the non-legacy station, e.g., in time to detect and/or receive a control frame following the non-data PPDU 210 (FIG. 2A).

In some demonstrative embodiments, a non-legacy station, e.g., device 140 (FIG. 1), which may detect non-data PPDU 220 (FIG. 2B) with the PLCP header 228 (FIG. 2B) including the zero length in length field 229 (FIG. 2B), may be able to detect STF 222 (FIG. 2B) and to wake up a radio of the non-legacy station, e.g., in time to detect and/or receive a control frame following the non-data PPDU 220 (FIG. 2B).

Figure 3:
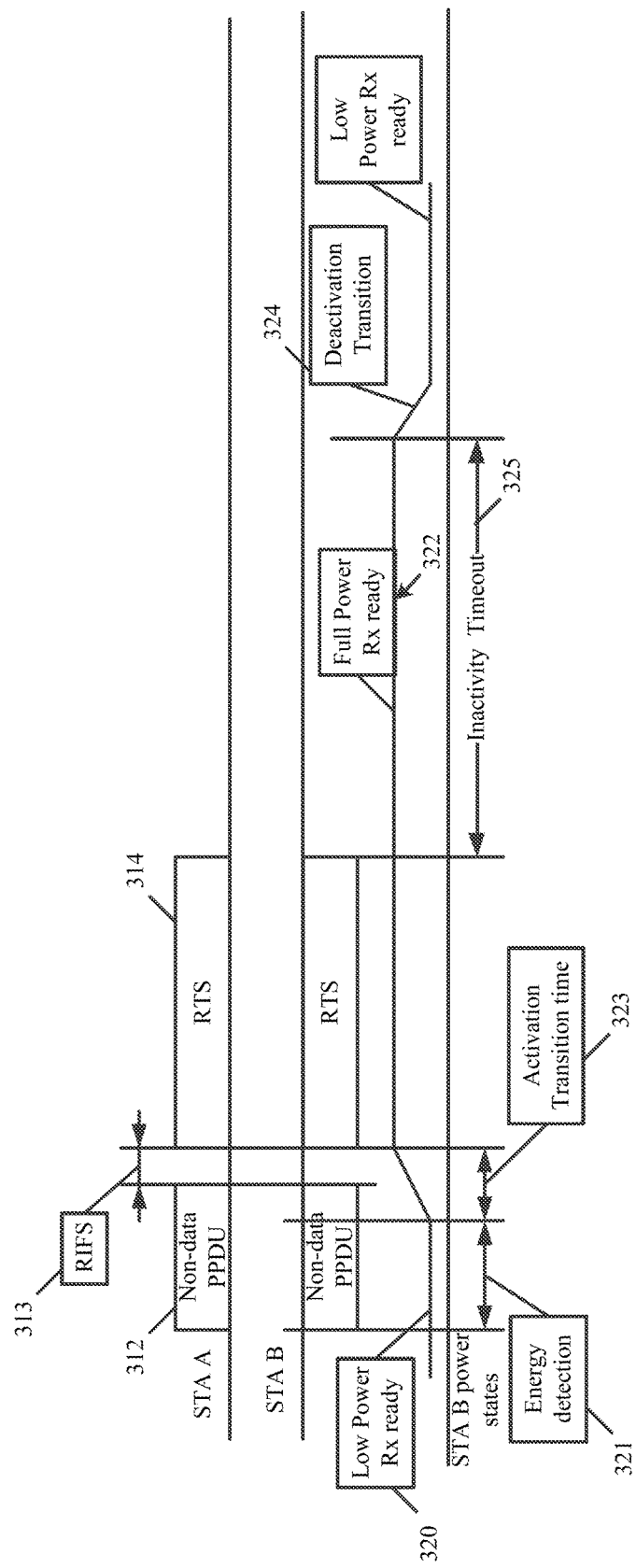
FIG. 3 is a schematic illustration of a power state of a wireless station to receive a control frame subsequent to anon-data PPDU, in accordance with some demonstrative embodiments.

Reference is made to FIG. 3 which schematically illustrates a power state of a wireless station, denoted STA A, to receive a control frame subsequent to a non-data PPDU from another wireless station, denoted STA B, in accordance with some demonstrative embodiments. For example, device 102 (FIG. 1) may perform the functionality of the STA A, and/or device 140 (FIG. 1) may perform the functionality of the STA B.

In some demonstrative embodiments, as shown in FIG. 3, the STA A may initiate a link access, and may send to the STA B a non-data PPDU 312, which may be followed by a control frame, e.g., an RTS frame 314.

In some demonstrative embodiments, non-data PPDU 312 may include, for example, non-data PPDU 210 (FIG. 2A) or non-data PPDU 220 (FIG. 2B). In other embodiments, non-data PPDU 312 may have any other non-data PPDU format.

In some demonstrative embodiments, as shown in FIG. 3, RTS frame 314 may be separated from non-data PPDU 312 by a RIFS 313

In some demonstrative embodiments, as shown in FIG. 3, the STA B may operate in a Low Power Receive (Rx) ready state 320, which may be configured to have only a small part of receiver circuitry powered on, e.g., to enable the STA B to detect a non-data PPDU, e.g., the non-data PPDU 312.

In some demonstrative embodiments, as shown in FIG. 3, upon detecting (321) non-data PPDU 312, the STA B may activate (f) circuitry, e.g., during an activation transition time 323, for example, to enable the STA B to receive the forthcoming RTS frame 314.

In some demonstrative embodiments, as shown in FIG. 3, a duration of non-data PPDU 312 and RIFS 313 may be long enough, for example, at least as long as the activation transition time 323, and, accordingly, may enable the STA B to switch to the active receive power state in time to receive RTS frame 314.

In some demonstrative embodiments, as shown in FIG. 3, the STA B may switch back to the Low Power Rx ready power state, for example, after expiration of an Inactivity Timeout 325, e.g., to enable the STA B to spend minimal power. For example, the STA B may select to switch back to the Low Power Rx ready state (324), for example, if STA B is to determine that there no continuation of a Transmit Opportunity (TXOP) sequence corresponding to the RTS frame 314, or if the STA B determines, e.g., based on RTS frame 314, that the STA B is not intended to receive communication from the STA A.

Figure 4:
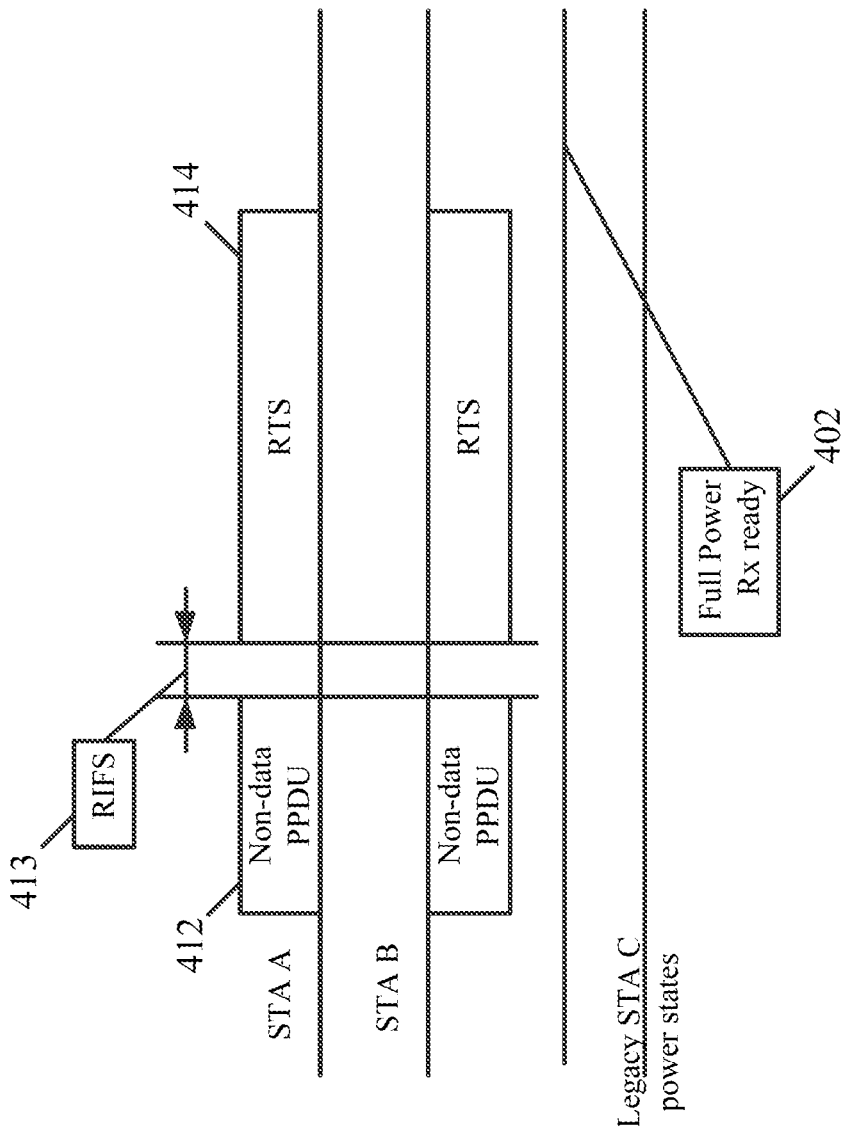
FIG. 4 is a schematic illustration of a power state of a legacy station with respect to an observed communication of a non-data PPDU and a control frame, in accordance with some demonstrative embodiments.

Reference is made to FIG. 4, which schematically illustrates a power state of a legacy station, denoted STA C, with respect to an observed communication of a non-data PPDU 412 and a control frame 414, e.g., communicated between the STA A and the STA B, in accordance with some demonstrative embodiments.

In some demonstrative embodiments, as shown in FIG. 4, the STA A may initiate a link access, and may send to the STA B a non-data PPDU frame 412, followed by a control frame, e.g., RTS control frame 414.

In some demonstrative embodiments, non-data PPDU 412 may include, for example, non-data PPDU 210 (FIG. 2A) or non-data PPDU 220 (FIG. 2B). In other embodiments, non-data PPDU 412 may have any other non-data PPDU format.

In some demonstrative embodiments, as shown in FIG. 4, RTS frame 414 may be separated from non-data PPDU frame 412 by a RIFS 413

In some demonstrative embodiments, as shown in FIG. 4, the STA C may be continuously operate at a full power Rx ready power state 402.

In some demonstrative embodiments, as shown in FIG. 4, the STA C may detect the non-data PPDU frame 412, and may then receive the RTS frame 414 within the RIFS time 413.

In some demonstrative embodiments, the STA C may include a legacy device, which interpret the non-data PPDU 412 as an invalid PPDU, e.g., as described above.

In some demonstrative embodiments, the control frame 414 may be decodable by the legacy STA C. Accordingly, the STA C may be able to properly process the control frame 414, for example, to assert a NAV of the STA C based on the RTS control frame 414.

In some demonstrative embodiments, as shown in FIG. 4, the STA C may continue to operate at the full power Rx ready power state 402, e.g., even after receipt of the RTS frame 413.

Referring back to FIG. 1, in some demonstrative embodiments, device 140 may transmit a CTS frame to device 102, e.g., in response to an RTS frame from device 102.

In some demonstrative embodiments, device 140 may be configured to preface transmission of the CTS frame, for example, by a non-data PPDU, e.g., a preamble frame, for example, non-data PPDU 210 (FIG. 2A) or non-data PPDU 220 (FIG. 2B), e.g., as described below.

In some demonstrative embodiments, controller 124 may be configured to control, cause and/or trigger device 102 to transmit a first non-data PPDU, e.g., a preamble frame, for example, non-data PPDU 210 (FIG. 2A) or non-data PPDU 220 (FIG. 2B), to device 140, and to transmit to device 140 an RTS frame, which may be separated from the first non-data PPDU, for example, by a first RIFS, e.g., as described above.

In some demonstrative embodiments, controller 154 may be configured to control, cause and/or trigger device 140 to process the first non-data PPDU from device 102, and, for example, if device 140 is at a low power receive state, to activate device 140 to an active power receive state, for example, to process the RTS frame from device 102, e.g., as described above.

In some demonstrative embodiments, controller 154 may be configured to control, cause and/or trigger device 140 to transmit a second non-data PPDU, e.g., a preamble frame, for example, non-data PPDU 210 (FIG. 2A) or non-data PPDU 220 (FIG. 2B), to device 102, and to transmit to device 102 a CTS frame, which may be, for example, separated from the second non-data PPDU, for example, by a second RIFS.

In some demonstrative embodiments, controller 124 may be configured to control, cause and/or trigger device 102 to process the second non-data PPDU from device 140, and, for example, to ensure device 102 is at the active power receive state, for example, to process the CTS frame from device 140.

In some demonstrative embodiments, a communication scheme including an the first and second non-data PPDUs to indicate the respective exchange of RTS and CTS frames, may maintain a behavior of a network allocation vector (NAV), for example, even in deployments, implementations and/or use cases, including a network including a mix of stations, e.g., including at least one legacy station, for example, even if a CTS frame prefaced by the non-data PPDU is not received by the legacy station, e.g., as described below.

Figure 5:
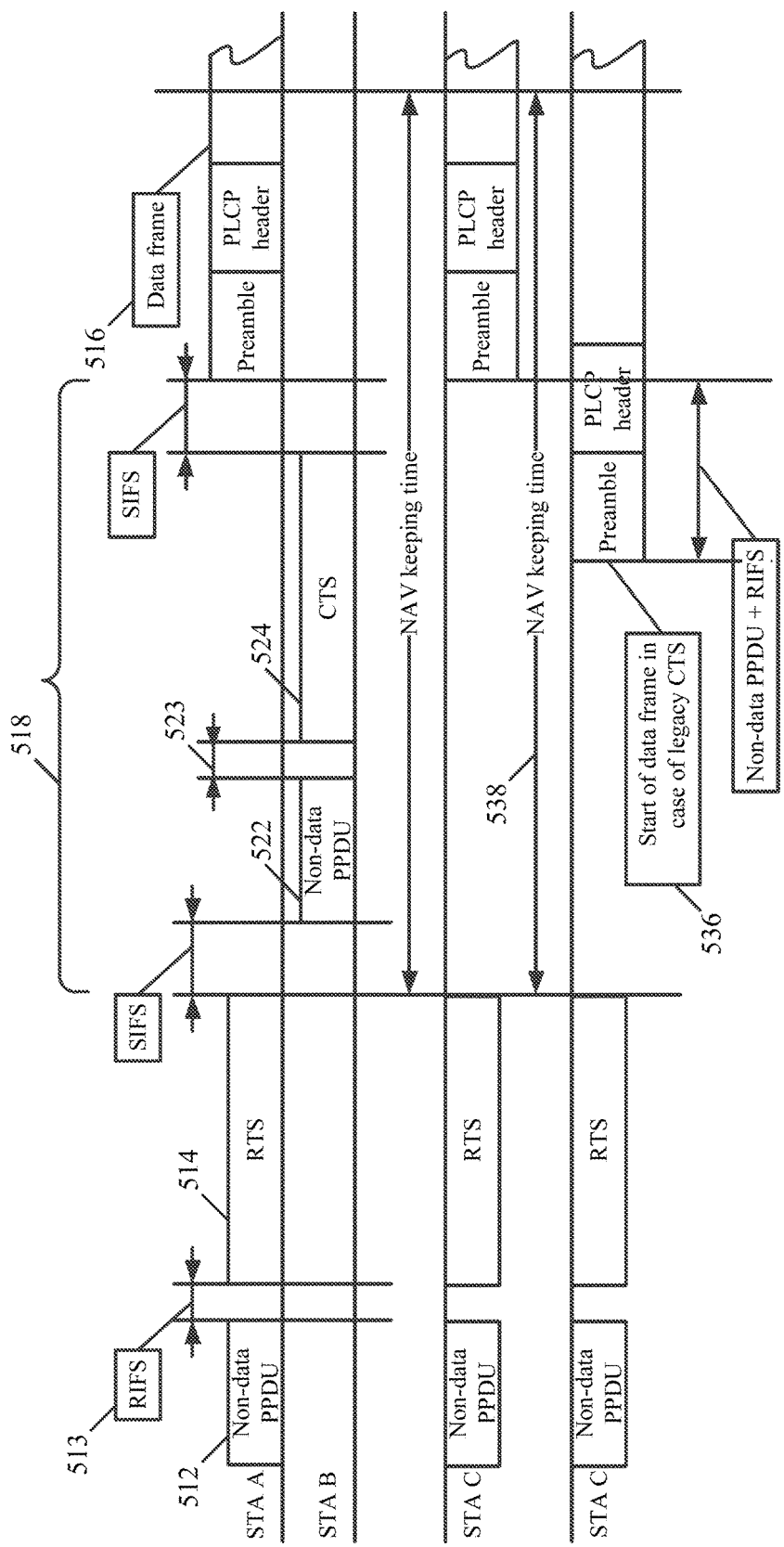
FIG. 5 is a schematic illustration of communications between a first station and a second station as observed by a third station, in accordance with some demonstrative embodiments.

Reference is made to FIG. 5, which schematically illustrates communications between a first station, denoted STA A, and a second station, denoted STA B, as observed by a third device, denoted STA C, in accordance with some demonstrative embodiments. For example, device 102 (FIG. 1) may perform the functionality of the STA A, and/or device 140 (FIG. 1) may perform the functionality of the STA B.

In some demonstrative embodiments, as shown in FIG. 5, STA A may initiate a link access, and may send a first non-data PPDU 512, for example, followed by an RTS control frame 514.

In some demonstrative embodiments, non-data PPDU 512 may include, for example, non-data PPDU 210 (FIG. 2A) or non-data PPDU 220 (FIG. 2B). In other embodiments, non-data PPDU 512 may have any other non-data PPDU format.

In some demonstrative embodiments, as shown in FIG. 5, RTS frame 514 may be separated from non-data PPDU 512, e.g., by a first RIFS 513.

In some demonstrative embodiments, as shown in FIG. 5, STA B may receive RTS frame 514, and may send to STA A, a second non-data PPDU 522, for example, followed by a CTS control frame 524, e.g., in response to RTS frame 514.

In some demonstrative embodiments, non-data PPDU 522 may include, for example, non-data PPDU 210 (FIG. 2A) or non-data PPDU 220 (FIG. 2B). In other embodiments, non-data PPDU 522 may have any other non-data PPDU format.

In some demonstrative embodiments, as shown in FIG. 5, CTS frame 524 may be separated from the second non-data PPDU 522 by a second RIFS 523.

In some demonstrative embodiments, as shown a beginning of a data frame 516 following the CTS frame 524 may be spaced, e.g., by a time 518, from an end of RTS frame 518.

In some demonstrative embodiments, the time 518 may be extended by the sum of the duration of non-data PPDU frame 522 and the RIFS time 523, for example, compared to a space between the end of the RTS frame 514 and a start of a data frame 536 following a legacy CTS frame is sent, e.g., if non-data PPDU frame 522 is not sent before the CTS frame.

In some demonstrative embodiments, the STA C may include a legacy station, which may interpret the non-data PPDU 514 and/or the non-data PPDU 524 as an invalid PPDU, and which may be able to decode and/or process control frames, e.g., CTS frame 524 and/or RTS frame 514.

In some demonstrative embodiments, as shown in FIG. 5, the STA C, may use information from RTS frame 514, which may be properly decodable by the STA C, as a most recent basis to update a NAV setting of the STA C.

For example, the STA C may keep a NAV of STA C asserted, during a NAV keeping time 538, which may be defined to start, for example, at the PHY-RXEND.indication primitive corresponding to the detection of the RTS frame 514. For example, the STA C may keep the NAV of STA C asserted, if a PHY-RXSTART.indication primitive is received from a Physical layer (PHY) of the STA C during a period that is no longer than a NAV keeping time 538.

For example, the NAV keeping time 538 may be defined, e.g., as follows:

$$\text{NAV keeping time} = (2 \times \text{aSIFSTime}) + (\text{CTS\_Time}) + \text{aRxPHYStartDelay} + (2 \times \text{aSlotTime}) \quad (1)$$

wherein aSIFSTime denotes duration of a SIFS, CTS_Time denotes duration of a CTS, aRxPHYStartDelay denotes a receiver PHY delay time, and wherein aSlotTime denotes a predefined slot time, e.g., 5 microseconds.

In some demonstrative embodiments, non-data PPDU 522 may be configured to have a duration, which may no longer than, e.g., equal to the duration of the aSlotTime, e.g., 5 microseconds.

In some demonstrative embodiments, as shown in FIG. 5, the STA C, may receive the data frame 516 well before the NAV keeping time 538 expires, e.g., if the duration of non-data PPDU frame 522 is about an aSlotTime. Accordingly, the STA C may be able to keep the NAV, for example, while the data frame 516 may arrive later.

Figure 6:
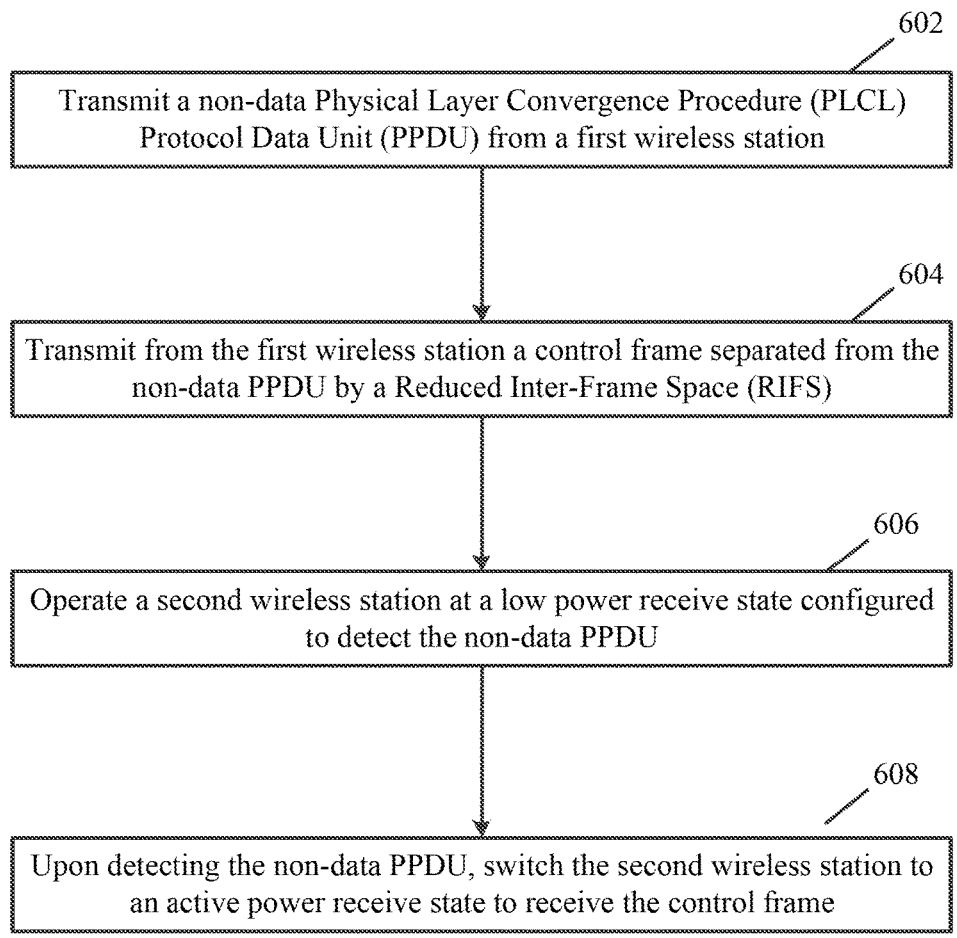
FIG. 6 is a schematic flow-chart illustration of a method of communicating a non-data PPDU, in accordance with some demonstrative embodiments.

Reference is made to FIG. 6, which schematically illustrates a method of communicating a non-data PPDU, in accordance with some demonstrative embodiments. For example, one or more of the operations of the method of FIG. 6 may be performed by one or more elements of a system, e.g., system 100 (FIG. 1), for example, one or more wireless devices, e.g., device 102 (FIG. 1), and/or device 140 (FIG. 1); a controller, e.g., controller 154 (FIG. 1), and/or controller 124 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 602, the method may include transmitting a non-data PPDU from a first wireless station. For example, controller 124 (FIG. 1) may be configured to control, cause and/or trigger device 102 (FIG. 1) to transmit the non-data PPDU 210 (FIG. 2A) or the non-data PPDU 220 (FIG. 2B), e.g., as described above.

As indicated at block 604, the method may include transmitting a control frame following the non-data PPDU, e.g., separated from the non-data PPDU by a RIFS. For example, controller 124 (FIG. 1) may be configured to control, cause and/or trigger device 102 (FIG. 1) to transmit an RTS frame, e.g., RTS frame 314 (FIG. 3), which may be separated from the non-data PPDU by a RIFS, e.g., as described above.

As indicated at block 606, the method may include operating a second wireless station at a low power receive state configured to detect the non-data PPDU. For example, controller 154 (FIG. 1) may be configured to control, cause and/or trigger device 140 (FIG. 1) to operate at the low power receive state to detect the non-data PPDU from device 102 (FIG. 1), e.g., as described above.

As indicated at block 608, the method may include switching the second wireless station to an active power receive state to receive the control frame from the first device, for example, upon detecting the non-data PPDU. For example, controller 154 (FIG. 1) may be configured to control, cause and/or trigger device 140 (FIG. 1) to switch to the active power receive state to receive the RTS frame, for example, upon detecting the non-data PPDU from device 102 (FIG. 1), e.g., as described above.

Figure 7:
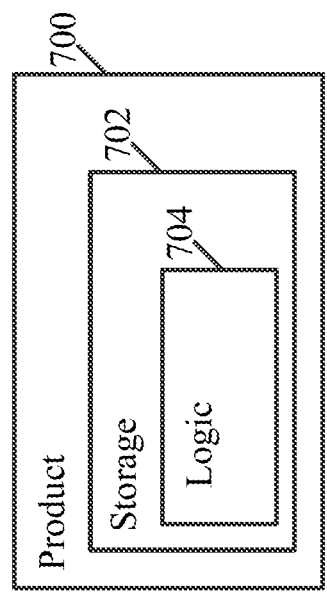
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include one or more tangible computer-readable non-transitory storage media 702, which may include computer-executable instructions, e.g., implemented by logic 704, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), and/or to perform, trigger and/or implement one or more operations, communications and/or functionalities according to FIGS. 1, 2, 3, 4, 5, and/or 6, and/or one or more operations described herein. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry and logic configured to cause a wireless station to transmit a non-data physical layer convergence procedure (PLCP) protocol data unit (PPDU); and transmit a control frame separated from the non-data PPDU by a Reduced Inter-Frame Space (RIFS).

Example 2 includes the subject matter of Example 1, and optionally, wherein the non-data PPDU comprises only a preamble.

Example 3 includes the subject matter of Example 1, and optionally, wherein the non-data PPDU comprises only a short training field (STF).

Example 4 includes the subject matter of Example 3, and optionally, wherein the STF comprises training sequences, which do not end with a stop sequence.

Example 5 includes the subject matter of Example 1, and optionally, wherein the non-data PPDU comprises no more than a preamble and a PLCP header.

Example 6 includes the subject matter of Example 5, and optionally, wherein the PLCP header comprises a length field comprising a zero length value.

Example 7 includes the subject matter of any one of Examples 1-6, and optionally, wherein the control frame comprises a Request To Send (RTS) frame or a Clear To Send (CTS) frame.

Example 8 includes the subject matter of any one of Examples 1-7, and optionally, wherein the apparatus is configured to cause the wireless station to transmit a first non-data PPDU to an other wireless station, to transmit to the other wireless station a Request To Send (RTS) frame separated from the first non-data PPDU by a first RIFS, to process a second non-data PPDU from the other wireless station, and to process a Clear To Send (CTS) frame from the other wireless station, the CTS frame is separated from the second non-data PPDU by a second RIFS.

Example 9 includes the subject matter of any one of Examples 1-8, and optionally, wherein a duration of the non-data PPDU is no more than an aSlotTime.

Example 10 includes the subject matter of any one of Examples 1-9, and optionally, wherein a duration of the non-data PPDU is no more than five microseconds.

Example 11 includes the subject matter of any one of Examples 1-10, and optionally, wherein the non-data PPDU is interpretable as an invalid PPDU by a legacy station, and the control frame is decodable by the legacy station.

Example 12 includes the subject matter of any one of Examples 1-11, and optionally, comprising a radio to transmit the non-PPDU and the control frame.

Example 13 includes the subject matter of any one of Examples 1-12, and optionally, comprising one or more antennas, a processor, and a memory.

Example 14 includes a system of wireless communication comprising a wireless station, the wireless station comprising one or more antennas; a radio; a memory; a processor; and a controller configured to cause the wireless station to transmit a non-data physical layer convergence procedure (PLCP) protocol data unit (PPDU); and transmit a control frame separated from the non-data PPDU by a Reduced Inter-Frame Space (RIFS).

Example 15 includes the subject matter of Example 14, and optionally, wherein the non-data PPDU comprises only a preamble.

Example 16 includes the subject matter of Example 14, and optionally, wherein the non-data PPDU comprises only a short training field (STF).

Example 17 includes the subject matter of Example 16, and optionally, wherein the STF comprises training sequences, which do not end with a stop sequence.

Example 18 includes the subject matter of Example 14, and optionally, wherein the non-data PPDU comprises no more than a preamble and a PLCP header.

Example 19 includes the subject matter of Example 18, and optionally, wherein the PLCP header comprises a length field comprising a zero length value.

Example 20 includes the subject matter of any one of Examples 14-19, and optionally, wherein the control frame comprises a Request To Send (RTS) frame or a Clear To Send (CTS) frame.

Example 21 includes the subject matter of any one of Examples 14-20, and optionally, wherein the controller is configured to cause the wireless station to transmit a first non-data PPDU to an other wireless station, to transmit to the other wireless station a Request To Send (RTS) frame separated from the first non-data PPDU by a first RIFS, to process a second non-data PPDU from the other wireless station, and to process a Clear To Send (CTS) frame from the other wireless station, the CTS frame is separated from the second non-data PPDU by a second RIFS.

Example 22 includes the subject matter of any one of Examples 14-21, and optionally, wherein a duration of the non-data PPDU is no more than an aSlotTime.

Example 23 includes the subject matter of any one of Examples 14-22, and optionally, wherein a duration of the non-data PPDU is no more than five microseconds.

Example 24 includes the subject matter of any one of Examples 14-23, and optionally, wherein the non-data PPDU is interpretable as an invalid PPDU by a legacy station, and the control frame is decodable by the legacy station.

Example 25 includes a method to be performed at a wireless station, the method comprising transmitting a non-data physical layer convergence procedure (PLCP) protocol data unit (PPDU); and transmitting a control frame separated from the non-data PPDU by a Reduced Inter-Frame Space (RIFS).

Example 26 includes the subject matter of Example 25, and optionally, wherein the non-data PPDU comprises only a preamble.

Example 27 includes the subject matter of Example 25, and optionally, wherein the non-data PPDU comprises only a short training field (STF).

Example 28 includes the subject matter of Example 27, and optionally, wherein the STF comprises training sequences, which do not end with a stop sequence.

Example 29 includes the subject matter of Example 25, and optionally, wherein the non-data PPDU comprises no more than a preamble and a PLCP header.

Example 30 includes the subject matter of Example 29, and optionally, wherein the PLCP header comprises a length field comprising a zero length value.

Example 31 includes the subject matter of any one of Examples 25-30, and optionally, wherein the control frame comprises a Request To Send (RTS) frame or a Clear To Send (CTS) frame.

Example 32 includes the subject matter of any one of Examples 25-31, and optionally, comprising transmitting a first non-data PPDU to an other wireless station, transmitting to the other wireless station a Request To Send (RTS) frame separated from the first non-data PPDU by a first RIFS, processing a second non-data PPDU from the other wireless station, and processing a Clear To Send (CTS) frame from the other wireless station, the CTS frame is separated from the second non-data PPDU by a second RIFS.

Example 33 includes the subject matter of any one of Examples 25-32, and optionally, wherein a duration of the non-data PPDU is no more than an aSlotTime.

Example 34 includes the subject matter of any one of Examples 25-33, and optionally, wherein a duration of the non-data PPDU is no more than five microseconds.

Example 35 includes the subject matter of any one of Examples 25-34, and optionally, wherein the non-data PPDU is interpretable as an invalid PPDU by a legacy station, and the control frame is decodable by the legacy station.

Example 36 includes a product comprising one or more tangible computer-readable non-transitory storage media comprising computer-executable instructions operable to, when executed by at least one computer processor, enable the at least one computer processor to implement operations at a wireless station, the operations comprising transmitting a non-data physical layer convergence procedure (PLCP) protocol data unit (PPDU); and transmitting a control frame separated from the non-data PPDU by a Reduced Inter-Frame Space (RIFS).

Example 37 includes the subject matter of Example 36, and optionally, wherein the non-data PPDU comprises only a preamble.

Example 38 includes the subject matter of Example 36, and optionally, wherein the non-data PPDU comprises only a short training field (STF).

Example 39 includes the subject matter of Example 38, and optionally, wherein the STF comprises training sequences, which do not end with a stop sequence.

Example 40 includes the subject matter of Example 36, and optionally, wherein the non-data PPDU comprises no more than a preamble and a PLCP header.

Example 41 includes the subject matter of Example 40, and optionally, wherein the PLCP header comprises a length field comprising a zero length value.

Example 42 includes the subject matter of any one of Examples 36-41, and optionally, wherein the control frame comprises a Request To Send (RTS) frame or a Clear To Send (CTS) frame.

Example 43 includes the subject matter of any one of Examples 36-42, and optionally, wherein the operations comprise transmitting a first non-data PPDU to an other wireless station, transmitting to the other wireless station a Request To Send (RTS) frame separated from the first non-data PPDU by a first RIFS, processing a second non-data PPDU from the other wireless station, and processing a Clear To Send (CTS) frame from the other wireless station, the CTS frame is separated from the second non-data PPDU by a second RIFS.

Example 44 includes the subject matter of any one of Examples 36-43, and optionally, wherein a duration of the non-data PPDU is no more than an aSlotTime.

Example 45 includes the subject matter of any one of Examples 36-44, and optionally, wherein a duration of the non-data PPDU is no more than five microseconds.

Example 46 includes the subject matter of any one of Examples 36-45, and optionally, wherein the non-data PPDU is interpretable as an invalid PPDU by a legacy station, and the control frame is decodable by the legacy station.

Example 47 includes an apparatus of wireless communication by a wireless station, the apparatus comprising means for transmitting a non-data physical layer convergence procedure (PLCP) protocol data unit (PPDU); and means for transmitting a control frame separated from the non-data PPDU by a Reduced Inter-Frame Space (RIFS).

Example 48 includes the subject matter of Example 47, and optionally, wherein the non-data PPDU comprises only a preamble.

Example 49 includes the subject matter of Example 47, and optionally, wherein the non-data PPDU comprises only a short training field (STF).

Example 50 includes the subject matter of Example 49, and optionally, wherein the STF comprises training sequences, which do not end with a stop sequence.

Example 51 includes the subject matter of Example 47, and optionally, wherein the non-data PPDU comprises no more than a preamble and a PLCP header.

Example 52 includes the subject matter of Example 51, and optionally, wherein the PLCP header comprises a length field comprising a zero length value.

Example 53 includes the subject matter of any one of Examples 47-52, and optionally, wherein the control frame comprises a Request To Send (RTS) frame or a Clear To Send (CTS) frame.

Example 54 includes the subject matter of any one of Examples 47-53, and optionally, comprising means for transmitting a first non-data PPDU to an other wireless station, transmitting to the other wireless station a Request To Send (RTS) frame separated from the first non-data PPDU by a first RIFS, processing a second non-data PPDU from the other wireless station, and processing a Clear To Send (CTS) frame from the other wireless station, the CTS frame is separated from the second non-data PPDU by a second RIFS.

Example 55 includes the subject matter of any one of Examples 47-54, and optionally, wherein a duration of the non-data PPDU is no more than an aSlotTime.

Example 56 includes the subject matter of any one of Examples 47-55, and optionally, wherein a duration of the non-data PPDU is no more than five microseconds.

Example 57 includes the subject matter of any one of Examples 47-56, and optionally, wherein the non-data PPDU is interpretable as an invalid PPDU by a legacy station, and the control frame is decodable by the legacy station.

Example 58 includes an apparatus comprising circuitry and logic configured to cause a wireless station to operate at a low power receive state configured to detect a non-data physical layer convergence procedure (PLCP) protocol data unit (PPDU); and upon detecting the non-data PPDU, switch to an active power receive state to receive a control frame separated from the non-data PPDU by a Reduced Inter-Frame Space (RIFS).

Example 59 includes the subject matter of Example 58, and optionally, wherein the non-data PPDU comprises only a preamble.

Example 60 includes the subject matter of Example 58, and optionally, wherein the non-data PPDU comprises only a short training field (STF).

Example 61 includes the subject matter of Example 60, and optionally, wherein the STF comprises training sequences, which do not end with a stop sequence.

Example 62 includes the subject matter of Example 58, and optionally, wherein the non-data PPDU comprises no more than a preamble and a PLCP header.

Example 63 includes the subject matter of Example 62, and optionally, wherein the PLCP header comprises a length field comprising a zero length value.

Example 64 includes the subject matter of any one of Examples 58-63, and optionally, wherein the control frame comprises a Request To Send (RTS) frame or a Clear To Send (CTS) frame.

Example 65 includes the subject matter of any one of Examples 58-64, and optionally, wherein the apparatus is configured to cause the wireless station to process a first non-data PPDU from an other wireless station, to process a Request To Send (RTS) frame from the other wireless station, the RTS frame is separated from the first non-data PPDU by a first RIFS, to transmit a second non-data PPDU to the other wireless station, and to transmit to the other wireless station a Clear To Send (CTS) frame separated from the second non-data PPDU by a second RIFS.

Example 66 includes the subject matter of any one of Examples 58-65, and optionally, wherein a duration of the non-data PPDU is no more than an aSlotTime.

Example 67 includes the subject matter of any one of Examples 58-66, and optionally, wherein a duration of the non-data PPDU is no more than five microseconds.

Example 68 includes the subject matter of any one of Examples 58-67, and optionally, wherein the non-data PPDU is interpretable as an invalid PPDU by a legacy station, and the control frame is decodable by the legacy station.

Example 69 includes the subject matter of any one of Examples 58-68, and optionally, wherein the apparatus is configured to allow the wireless station to switch to the low power receive state based on the control frame.

Example 70 includes the subject matter of any one of Examples 58-69, and optionally, comprising a radio to receive the non-data PPDU and the control frame.

Example 71 includes the subject matter of any one of Examples 58-70, and optionally, comprising one or more antennas, a processor, and a memory.

Example 72 includes a system of wireless communication comprising a wireless station, the wireless station comprising one or more antennas; a radio; a memory; a processor; and a controller configured to cause the wireless station to operate at a low power receive state configured to detect a non-data physical layer convergence procedure (PLCP) protocol data unit (PPDU); and upon detecting the non-data PPDU, switch to an active power receive state to receive a control frame separated from the non-data PPDU by a Reduced Inter-Frame Space (RIFS).

Example 73 includes the subject matter of Example 72, and optionally, wherein the non-data PPDU comprises only a preamble.

Example 74 includes the subject matter of Example 72, and optionally, wherein the non-data PPDU comprises only a short training field (STF).

Example 75 includes the subject matter of Example 74, and optionally, wherein the STF comprises training sequences, which do not end with a stop sequence.

Example 76 includes the subject matter of Example 72, and optionally, wherein the non-data PPDU comprises no more than a preamble and a PLCP header.

Example 77 includes the subject matter of Example 76, and optionally, wherein the PLCP header comprises a length field comprising a zero length value.

Example 78 includes the subject matter of any one of Examples 72-77, and optionally, wherein the control frame comprises a Request To Send (RTS) frame or a Clear To Send (CTS) frame.

Example 79 includes the subject matter of any one of Examples 72-78, and optionally, wherein the controller is configured to cause the wireless station to process a first non-data PPDU from an other wireless station, to process a Request To Send (RTS) frame from the other wireless station, the RTS frame is separated from the first non-data PPDU by a first RIFS, to transmit a second non-data PPDU to the other wireless station, and to transmit to the other wireless station a Clear To Send (CTS) frame separated from the second non-data PPDU by a second RIFS.

Example 80 includes the subject matter of any one of Examples 72-79, and optionally, wherein a duration of the non-data PPDU is no more than an aSlotTime.

Example 81 includes the subject matter of any one of Examples 72-80, and optionally, wherein a duration of the non-data PPDU is no more than five microseconds.

Example 82 includes the subject matter of any one of Examples 72-81, and optionally, wherein the non-data PPDU is interpretable as an invalid PPDU by a legacy station, and the control frame is decodable by the legacy station.

Example 83 includes the subject matter of any one of Examples 72-82, and optionally, wherein the controller is configured to allow the wireless station to switch to the low power receive state based on the control frame.

Example 84 includes a method to be performed at a wireless station, the method comprising operating at a low power receive state configured to detect a non-data physical layer convergence procedure (PLCP) protocol data unit (PPDU); and upon detecting the non-data PPDU, switching to an active power receive state to receive a control frame, the control frame is separated from the non-data PPDU by a Reduced Inter-Frame Space (RIFS).

Example 85 includes the subject matter of Example 84, and optionally, wherein the non-data PPDU comprises only a preamble.

Example 86 includes the subject matter of Example 84, and optionally, wherein the non-data PPDU comprises only a short training field (STF).

Example 87 includes the subject matter of Example 86, and optionally, wherein the STF comprises training sequences, which do not end with a stop sequence.

Example 88 includes the subject matter of Example 84, and optionally, wherein the non-data PPDU comprises no more than a preamble and a PLCP header.

Example 89 includes the subject matter of Example 88, and optionally, wherein the PLCP header comprises a length field comprising a zero length value.

Example 90 includes the subject matter of any one of Examples 84-89, and optionally, wherein the control frame comprises a Request To Send (RTS) frame or a Clear To Send (CTS) frame.

Example 91 includes the subject matter of any one of Examples 84-90, and optionally, comprising processing a first non-data PPDU from an other wireless station, processing a Request To Send (RTS) frame from the other wireless station, the RTS frame is separated from the first non-data PPDU by a first RIFS, transmitting a second non-data PPDU to the other wireless station, and transmitting to the other wireless station a Clear To Send (CTS) frame separated from the second non-data PPDU by a second RIFS.

Example 92 includes the subject matter of any one of Examples 84-91, and optionally, wherein a duration of the non-data PPDU is no more than an aSlotTime.

Example 93 includes the subject matter of any one of Examples 84-92, and optionally, wherein a duration of the non-data PPDU is no more than five microseconds.

Example 94 includes the subject matter of any one of Examples 84-93, and optionally, wherein the non-data PPDU is interpretable as an invalid PPDU by a legacy station, and the control frame is decodable by the legacy station.

Example 95 includes the subject matter of any one of Examples 84-94, and optionally, comprising switching to the low power receive state based on the control frame.

Example 96 includes a product comprising one or more tangible computer-readable non-transitory storage media comprising computer-executable instructions operable to, when executed by at least one computer processor, enable the at least one computer processor to implement operations at a wireless station, the operations comprising operating at a low power receive state configured to detect a non-data physical layer convergence procedure (PLCP) protocol data unit (PPDU); and upon detecting the non-data PPDU, switching to an active power receive state to receive a control frame, the control frame is separated from the non-data PPDU by a Reduced Inter-Frame Space (RIFS).

Example 97 includes the subject matter of Example 96, and optionally, wherein the non-data PPDU comprises only a preamble.

Example 98 includes the subject matter of Example 96, and optionally, wherein the non-data PPDU comprises only a short training field (STF).

Example 99 includes the subject matter of Example 98, and optionally, wherein the STF comprises training sequences, which do not end with a stop sequence.

Example 100 includes the subject matter of Example 96, and optionally, wherein the non-data PPDU comprises no more than a preamble and a PLCP header.

Example 101 includes the subject matter of Example 100, and optionally, wherein the PLCP header comprises a length field comprising a zero length value.

Example 102 includes the subject matter of any one of Examples 96-101, and optionally, wherein the control frame comprises a Request To Send (RTS) frame or a Clear To Send (CTS) frame.

Example 103 includes the subject matter of any one of Examples 96-102, and optionally, wherein the operations comprise processing a first non-data PPDU from an other wireless station, processing a Request To Send (RTS) frame from the other wireless station, the RTS frame is separated from the first non-data PPDU by a first RIFS, transmitting a second non-data PPDU to the other wireless station, and transmitting to the other wireless station a Clear To Send (CTS) frame separated from the second non-data PPDU by a second RIFS.

Example 104 includes the subject matter of any one of Examples 96-103, and optionally, wherein a duration of the non-data PPDU is no more than an aSlotTime.

Example 105 includes the subject matter of any one of Examples 96-104, and optionally, wherein a duration of the non-data PPDU is no more than five microseconds.

Example 106 includes the subject matter of any one of Examples 96-105, and optionally, wherein the non-data PPDU is interpretable as an invalid PPDU by a legacy station, and the control frame is decodable by the legacy station.

Example 107 includes the subject matter of any one of Examples 96-106, and optionally, wherein the operations comprise switching to the low power receive state based on the control frame.

Example 108 includes an apparatus of wireless communication by a wireless station, the apparatus comprising means for operating at a low power receive state configured to detect a non-data physical layer convergence procedure (PLCP) protocol data unit (PPDU); and means for, upon detecting the non-data PPDU, switching to an active power receive state to receive a control frame separated from the non-data PPDU by a Reduced Inter-Frame Space (RIFS).

Example 109 includes the subject matter of Example 108, and optionally, wherein the non-data PPDU comprises only a preamble.

Example 110 includes the subject matter of Example 108, and optionally, wherein the non-data PPDU comprises only a short training field (STF).

Example 111 includes the subject matter of Example 110, and optionally, wherein the STF comprises training sequences, which do not end with a stop sequence.

Example 112 includes the subject matter of Example 108, and optionally, wherein the non-data PPDU comprises no more than a preamble and a PLCP header.

Example 113 includes the subject matter of Example 112, and optionally, wherein the PLCP header comprises a length field comprising a zero length value.

Example 114 includes the subject matter of any one of Examples 108-113, and optionally, wherein the control frame comprises a Request To Send (RTS) frame or a Clear To Send (CTS) frame.

Example 115 includes the subject matter of any one of Examples 108-114, and optionally, comprising means for processing a first non-data PPDU from an other wireless station, processing a Request To Send (RTS) frame from the other wireless station, the RTS frame is separated from the first non-data PPDU by a first RIFS, transmitting a second non-data PPDU to the other wireless station, and transmitting to the other wireless station a Clear To Send (CTS) frame separated from the second non-data PPDU by a second RIFS.

Example 116 includes the subject matter of any one of Examples 108-115, and optionally, wherein a duration of the non-data PPDU is no more than an aSlotTime.

Example 117 includes the subject matter of any one of Examples 108-116, and optionally, wherein a duration of the non-data PPDU is no more than five microseconds.

Example 118 includes the subject matter of any one of Examples 108-117, and optionally, wherein the non-data PPDU is interpretable as an invalid PPDU by a legacy station, and the control frame is decodable by the legacy station.

Example 119 includes the subject matter of any one of Examples 108-118, and optionally, comprising means for switching to the low power receive state based on the control frame.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry and logic configured to cause a wireless station to:
   transmit a non-data physical layer convergence procedure (PLCP) protocol data unit (PPDU); and
   transmit a control frame separated from the non-data PPDU by a Reduced Inter-Frame Space (RIFS).

2. The apparatus of claim 1, wherein the non-data PPDU comprises only a preamble.

3. The apparatus of claim 1, wherein the non-data PPDU comprises only a short training field (STF).

4. The apparatus of claim 3, wherein the STF comprises training sequences, which do not end with a stop sequence.

5. The apparatus of claim 1, wherein the non-data PPDU comprises no more than a preamble and a PLCP header.

6. The apparatus of claim 5, wherein the PLCP header comprises a length field comprising a zero length value.

7. The apparatus of claim 1, wherein the control frame comprises a Request To Send (RTS) frame or a Clear To Send (CTS) frame.

8. The apparatus of claim 1 configured to cause the wireless station to transmit a first non-data PPDU to an other wireless station, to transmit to the other wireless station a Request To Send (RTS) frame separated from the first non-data PPDU by a first RIFS, to process a second non-data PPDU from the other wireless station, and to process a Clear To Send (CTS) frame from the other wireless station, said CTS frame is separated from said second non-data PPDU by a second RIFS.

9. The apparatus of claim 1, wherein a duration of the non-data PPDU is no more than an aSlotTime.

10. The apparatus of claim 1, wherein a duration of the non-data PPDU is no more than five microseconds.

11. The apparatus of claim 1, wherein the non-data PPDU is interpretable as an invalid PPDU by a legacy station, and the control frame is decodable by the legacy station.

12. The apparatus of claim 1 comprising a radio to transmit the non-PPDU and the control frame.

13. The apparatus of claim 1 comprising one or more antennas, a processor, and a memory.

14. A product comprising one or more tangible computer-readable non-transitory storage media comprising computer-executable instructions operable to, when executed by at least one computer processor, enable the at least one computer processor to implement operations at a wireless station, the operations comprising:
   transmitting a non-data physical layer convergence procedure (PLCP) protocol data unit (PPDU); and
   transmitting a control frame separated from the non-data PPDU by a Reduced Inter-Frame Space (RIFS).

15. The product of claim 14, wherein the operations comprise transmitting a first non-data PPDU to an other wireless station, transmitting to the other wireless station a Request To Send (RTS) frame separated from the first non-data PPDU by a first RIFS, processing a second non-data PPDU from the other wireless station, and processing a Clear To Send (CTS) frame from the other wireless station, said CTS frame is separated from said second non-data PPDU by a second RIFS.

16. An apparatus comprising circuitry and logic configured to cause a wireless station to:
   operate at a first power receive state configured to detect a non-data physical layer convergence procedure (PLCP) protocol data unit (PPDU); and
   upon detecting the non-data PPDU, switch to a second power receive state to receive a control frame separated from said non-data PPDU by a Reduced Inter-Frame Space (RIFS).

17. The apparatus of claim 16, wherein the non-data PPDU comprises only a preamble.

18. The apparatus of claim 16, wherein the non-data PPDU comprises only a short training field (STF).

19. The apparatus of claim 16, wherein the non-data PPDU comprises no more than a preamble and a PLCP header.

20. The apparatus of claim 16, wherein the control frame comprises a Request To Send (RTS) frame or a Clear To Send (CTS) frame.

21. The apparatus of claim 16 configured to cause the wireless station to process a first non-data PPDU from an other wireless station, to process a Request To Send (RTS) frame from the other wireless station, the RTS frame is separated from the first non-data PPDU by a first RIFS, to transmit a second non-data PPDU to the other wireless station, and to transmit to the other wireless station a Clear To Send (CTS) frame separated from said second non-data PPDU by a second RIFS.

22. The apparatus of claim 16 comprising one or more antennas, a processor, and a memory.

23. A product comprising one or more tangible computer-readable non-transitory storage media comprising computer-executable instructions operable to, when executed by at least one computer processor, enable the at least one computer processor to implement operations at a wireless station, the operations comprising:
   operating at a first power receive state configured to detect a non-data physical layer convergence procedure (PLCP) protocol data unit (PPDU); and
   upon detecting the non-data PPDU, switching to a second power receive state to receive a control frame, the control frame is separated from said non-data PPDU by a Reduced Inter-Frame Space (RIFS).

24. The product of claim 23, wherein the operations comprise processing a first non-data PPDU from an other wireless station, processing a Request To Send (RTS) frame from the other wireless station, the RTS frame is separated from the first non-data PPDU by a first RIFS, transmitting a second non-data PPDU to the other wireless station, and transmitting to the other wireless station a Clear To Send (CTS) frame separated from said second non-data PPDU by a second RIFS.

25. The product of claim 23, wherein the operations comprise switching to the first power receive state based on said control frame.

* * * * *